US011215751B2

(12) United States Patent
Poletti et al.

(10) Patent No.: US 11,215,751 B2
(45) Date of Patent: Jan. 4, 2022

(54) ANTIRESONANT HOLLOW CORE PREFORMS AND OPTICAL FIBRES AND METHODS OF FABRICATION

(71) Applicant: University of Southampton, Southampton (GB)

(72) Inventors: Francesco Poletti, Southampton (GB); Gregory Teofil Jasion, Southampton (GB); Natalie Wheeler, Southampton (GB); Thomas David Bradley, Southampton (GB); Mubassira B Syed Nawazuddin, Southampton (GB); John Hayes, Southampton (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 16/647,118

(22) PCT Filed: Sep. 11, 2018

(86) PCT No.: PCT/GB2018/052572
§ 371 (c)(1),
(2) Date: Mar. 13, 2020

(87) PCT Pub. No.: WO2019/053412
PCT Pub. Date: Mar. 21, 2019

(65) Prior Publication Data
US 2020/0278491 A1 Sep. 3, 2020

(30) Foreign Application Priority Data
Sep. 13, 2017 (GB) ...................... 1714739

(51) Int. Cl.
*G02B 6/02* (2006.01)
*C03B 37/012* (2006.01)
*G02B 6/024* (2006.01)

(52) U.S. Cl.
CPC ...... *G02B 6/02357* (2013.01); *C03B 37/0122* (2013.01); *C03B 37/01214* (2013.01);
(Continued)

(58) Field of Classification Search
CPC ............ G02B 6/02328; G02B 6/02357; G02B 6/20366
See application file for complete search history.

(56) References Cited

U.S. PATENT DOCUMENTS 6,539,155 B1  3/2003  Broeng et al.
7,245,807 B2  7/2007  Mangan et al.
(Continued)

FOREIGN PATENT DOCUMENTS

EP   1 086 391 A1   3/2001
JP   2016216314 A   12/2016
(Continued)

OTHER PUBLICATIONS

International Search Report and Written Opinion for corresponding International Patent Application No. PCT/G82018/052572 dated Dec. 3, 2018.
(Continued)

*Primary Examiner* — Chris H Chu
(74) *Attorney, Agent, or Firm* — Renner, Otto, Boisselle & Sklar, LLP

(57) ABSTRACT

A preform (10) for an antiresonant hollow core optical fibre comprises an outer jacket tube (12) having an inner surface and a central longitudinal axis (24); a plurality of antiresonant cladding tubes (14) spaced apart at predefined peripheral locations around the inner surface of the outer jacket tube (12), each antiresonant cladding tube (14) in contact with the inner surface such that a central longitudinal axis (26) of each antiresonant cladding tube (14) is at a first radial distance from the central longitudinal axis (24) of the outer
(Continued)

jacket tube (12); and a plurality of spacing elements (22) disposed alternately with the antiresonant cladding tubes (14) and each in contact with an outer surface of each of two adjacent antiresonant cladding tubes (14) at one or more contact points (28), the contact points (28) at a second radial distance from the central longitudinal axis (24) of the outer jacket tube (12), the second radial distance being greater than the first radial distance.

30 Claims, 10 Drawing Sheets

(52) U.S. Cl.
CPC ......... *G02B 6/024* (2013.01); *G02B 6/02328* (2013.01); *C03B 2203/16* (2013.01)

(56) References Cited

U.S. PATENT DOCUMENTS

| | | | |
|---|---|---|---|
| 10,393,956 B2* | 8/2019 | Russell | G02B 6/02366 |
| 2005/0276556 A1 | 12/2005 | Williams et al. | |
| 2010/0328658 A1* | 12/2010 | Benabid | C03B 37/02781 |
| | | | 356/301 |
| 2013/0022060 A1 | 1/2013 | Gaborel et al. | |
| 2016/0236964 A1* | 8/2016 | Fokoua | G02B 6/02357 |
| 2017/0160467 A1* | 6/2017 | Poletti | G02B 6/024 |

FOREIGN PATENT DOCUMENTS

| | | |
|---|---|---|
| WO | 99/64903 | 12/1999 |
| WO | 2004/001461 A1 | 12/2003 |
| WO | 2004/095099 A1 | 11/2004 |
| WO | 2015/040189 A2 | 3/2015 |
| WO | 2015/040189 A3 | 3/2015 |
| WO | 2015/185761 A1 | 12/2015 |

OTHER PUBLICATIONS

British Search Report for corresponding British Application No. GB 1714739.8 dated Mar. 6, 2018.

Yu, et al., "Negative Curvature Hollow-Core Optical Fiber," IEEE Journal of Selected Topics in Quantum Electronics, vol. 22, No. 2, Mar./Apr. 2016.

Wei, et al., "Negative curvature fibers," Article in Advances in Optics and Photonics, vol. 9, No. 3, pp. 504-561, Sep. 2017.

Pryamikov, et al., "Demonstration of a waveguide regime for a silica hollow—Core microstructured optical fiber with a negative curvature of the core boundary in the spectral region > 3.5 µm," Article in Optics Express, vol. 19, No. 2, pp. 1441-1448, Jan. 2011.

Kolyadin, et al., "Light transmission in negative curvature hollow core fiber in extremely high material loss region," Article in Optics Express, vol. 21, No. 8, pp. 9514-9519, Apr. 2013.

Poletti, "Nested antiresonant nodeless hollow core fiber," Optics Express, vol. 22, No. 20, pp. 23807-23828, Oct. 2014.

Mousavi, "Broadband high birefringence and polarizing hollow core antiresonant fibers," Article in Optics Express, vol. 24, No. 20, pp. 22943-22958, Oct. 2016.

Original and English Translation of Chinese Office Action issued for corresponding CN Application No. 201880059448.7, dated Apr. 21, 2021.

\* cited by examiner (a) (b)

ANTIRESONANT HOLLOW CORE PREFORMS AND OPTICAL FIBRES AND METHODS OF FABRICATION

BACKGROUND OF THE INVENTION

The present invention relates to optical fibres, in particular antiresonant hollow core optical fibres, and methods for fabricating this type of optical fibre from preforms.

Optical fibres include a type known as hollow core fibres which comprise a light-guiding core in the form of a central void surrounded by a cladding comprising a structured arrangement of longitudinal capillaries. Hollow core fibres can be categorized according to their optical guidance mechanism as hollow core photonic bandgap fibres in which the cladding comprises a regular array of many capillaries from which a central group is excluded to define the core, and antiresonant hollow core fibres which include negative curvature fibres, in a subset of which a smaller number of capillaries are bonded to the inner surface of a larger jacket tube around a central space defining the core.

To date, hollow core photonic bandgap fibres have shown lower optical transmission loss, although this is at the expense of a small usable optical bandwidth. Conversely, antiresonant hollow core fibres can have much larger bandwidths, but typically have a higher loss.

Antiresonant hollow core fibres of the negative curvature type can be made from glass, polymers, or other optical materials. The structure of a number of thin tubes or capillaries of circular or other shape secured around the inner surface of a larger jacket tube forms a central hollow core region where light can be guided by the combined effect of antiresonance from the thin surrounding tube walls and low overlap between air-guided optical modes and tube-guided optical modes [1].

Early implementations of these fibres comprised a ring of tubes in contact with each other around the inner surface of the jacket [2]. Subsequent research established that optical performance could be improved by spacing the tubes to eliminate any contact between adjacent tubes. This structure removes optical nodes that arise at the contact points between tubes and which tend to cause undesirable resonances that result in high loss peaks within the transmission spectrum of the fibre [3]. Hence these fibres may be referred to as "nodeless" antiresonant negative curvature fibres. Further developments showed that adding further, smaller tubes nested inside the existing tubes could allow the optical loss to be decreased by orders of magnitude [4, 5]. Fibres with this structure may be referred to as "nested antiresonant nodeless fibres (NANFs).

Modelling and simulations of these various nodeless structures do show a substantially improved optical loss characteristic as compared to structures with nodes (in which the ring of tubes are in contact). However, the models are based on idealized and perfectly symmetrical fibre structures in which the size, spacing and thickness of the tubes is optimal. In particular, low loss in a nodeless fibre requires a small and uniform separation between the spaced-apart tubes. Larger separations increase the loss by allowing the guide light to escape from the core more easily, while a closed gap (zero separation) increases loss by introducing a node. Experiment has shown that the desired regular structures are difficult to achieve in practice.

Optical fibres are fabricated from a preform, which replicates the desired cross-sectional structure for the fibre on a much larger scale. The preform is heated, and the softened structure is pulled to stretch it into the desired fibre, maintaining the relevant characteristics of the cross-sectional structure down to a much reduced diameter. For nodeless fibres, problems arise when attempting to achieve regular structures with thin walls and small tube spacings, owing to difficulties in drawing preforms comprising tubes which are in contact only with the outer jacket.

There are a number of reasons for this. Firstly, the tubes have only a small azimuthal contact point with the inner surface of the outer jacket. Fundamental fluid dynamics mechanisms that arise during the drawing process when the glass is softened mean that the tubes are prone to slight rotation about this contact point, and may even flip dramatically on either side of it in an uncontrollable way. Secondly, unavoidable manufacturing imprecisions in the tubes (such as bow, ovality and twist) mean that the contact line against the inner surface of the jacket is not always straight along the length of the preform, nor parallel to the contact lines of the other tubes. Finally, a process of applying pressure to inflate the tubes during the draw so as to reduce the ratio of wall thickness to diameter tends to accentuate small and unavoidable initial differences, such as tube-to-tube or longitudinal variations in outer diameter. Overall, therefore, both the position of the tubes and their diameter and thickness can deviate from the ideal in the finished fibre. Consequently, the expected optical performance may be unachievable.

Improvements in fibre fabrication are hence of interest, with a view to obtaining low loss antiresonant hollow core optical fibres.

SUMMARY OF THE INVENTION

Aspects and embodiments are set out in the appended claims.

According to a first aspect of certain embodiments described herein, there is provided a preform for an antiresonant hollow core optical fibre comprising; an outer jacket tube having an inner surface and a central longitudinal axis; a plurality of antiresonant cladding tubes spaced apart at predefined peripheral locations around the inner surface of the outer jacket tube, each antiresonant cladding tube in contact with the inner surface such that a central longitudinal axis of each antiresonant cladding tube is at a first radial distance from the central longitudinal axis of the outer jacket tube; and a plurality of spacing elements disposed alternately with the antiresonant cladding tubes and each in contact with an outer surface of each of two adjacent antiresonant cladding tubes at one or more contact points, the contact points at a second radial distance from the central longitudinal axis of the outer jacket tube, the second radial distance being greater than the first radial distance.

According to a second aspect of certain embodiments described herein, there is provided an intermediate cane for an antiresonant hollow core optical fibre drawn from a preform according to the first aspect.

According to a third aspect of certain embodiments described herein, there is provided an antiresonant hollow core optical fibre drawn from a preform according to the first aspect or the second aspect.

According to a fourth aspect of certain embodiments described herein, there is provided an antiresonant hollow core optical fibre comprising: a cladding comprising: a tubular outer jacket having an inner surface and a central longitudinal axis; a plurality of antiresonant cladding capillaries spaced apart around the inner surface of the outer jacket tube, each antiresonant cladding capillary bonded to the inner surface at a predefined peripheral location such that a central longitudinal axis of each cladding tube is at a first radial distance from the central longitudinal axis of the tubular outer jacket; and a plurality of spacing elements disposed alternately with the antiresonant cladding capillaries and each bonded to an outer surface of each of two adjacent antiresonant cladding capillaries at one or more contact points, the contact points at a second radial distance from the central longitudinal axis of the tubular outer jacket; and a core comprising a central void bounded by inwardly-facing portions of the outer surfaces of the antiresonant cladding capillaries.

According to a fifth aspect of certain embodiments described herein, there is provided a method of making a preform for an antiresonant hollow core optical fibre comprising: providing a plurality of antiresonant cladding tubes at predefined peripheral locations inside an outer jacket tube having an inner surface and a central longitudinal axis such that the antiresonant cladding tubes are spaced apart around the inner surface and each antiresonant cladding tube is in contact with the inner surface such that a central longitudinal axis of each antiresonant cladding tube is at a first radial distance from the central longitudinal axis of the outer jacket tube; providing a plurality of spacing elements alternately with the antiresonant cladding tubes and each in contact with an outer surface of each of two adjacent antiresonant cladding tubes at one or more contact points, the contact points at a second radial distance from the central longitudinal axis of the outer jacket tube, the second radial distance being greater than the first radial distance; and optionally securing the antiresonant cladding tubes and the spacing elements into their positions within the outer jacket tube.

According to a sixth aspect of certain embodiments described herein, there is provided a method of making an antiresonant hollow core optical fibre comprising: making a preform according to the method of the fifth aspect; and drawing the preform into an optical fibre.

According to a seventh aspect of certain embodiments described herein, there is provided a method of making an intermediate cane for an antiresonant hollow core optical fibre comprising: making a preform according to the method of the fifth aspect; and drawing the preform into an intermediate cane.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a preform for an antiresonant hollow core optical fibre, an antiresonant hollow core optical fibre or method for fabricating these fibres and preforms may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Embodiments of the present disclosure relate to preforms for making antiresonant hollow core optical fibres which are configured to improve the relative position of the various components comprised in the fibres drawn from the preforms.

Figure 1:
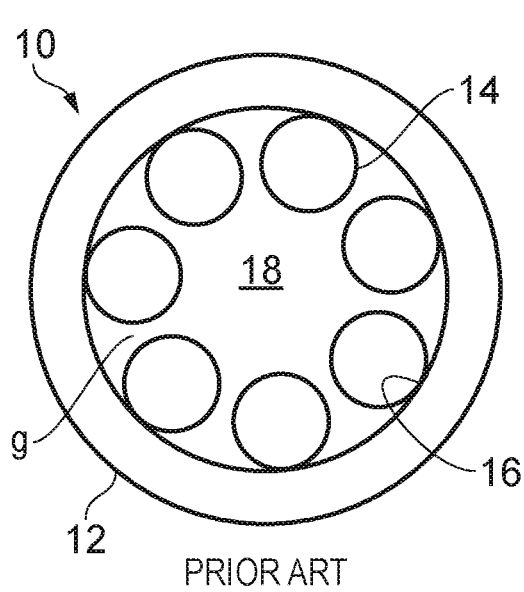
FIG. 1 shows a schematic cross-sectional view of an example antiresonant hollow core optical fibre according to the prior art.

FIG. 1 shows a schematic cross-sectional view through an idealized antiresonant hollow core optical fibre with a precise, symmetrical structure. The cross-sectional arrangement of the various components is preserved along the length of the fibre 10 (into and out of the plane of the page as depicted). The fibre 10 comprises an outer jacket 12 in the form of a hollow tube of relatively large diameter, formed, for example, from glass. A number, in this case seven, of smaller hollow tubes or capillaries 14 are positioned at precise and predefined locations inside the outer jacket 12. These tubes 14, also of glass, have a smaller diameter than the outer jacket 12, and in this example each have the same diameter. They are arranged around the inner circumference of the outer jacket 12 such that they are spaced apart and do not contact one another. Hence there is a gap g between adjacent tubes 14, the gap g between each pair of tubes being equal in this ideal structure. Each tube 14 is in contact with the inner surface of the outer jacket 12 at a single location 16, the locations 16 being equally spaced around the periphery of the outer jacket 12. The tubes 14 are sized to leave a central void 18, forming the core of the fibre 10. The tubes 14 and the jacket 12 form the fibre cladding, and the structure and positions of the tubes 14 allow the fibre 10 to guide light along the core via antiresonant effects, so can be designated as antiresonant cladding tubes. The core 18 has a boundary with a shape defined by the inwardly-facing outer surfaces of the cladding tubes 14; this leads to the "negative curvature fibre" nomenclature for this fibre type. The presence of the gaps g between the cladding tubes 14 eliminates nodes from the fibre structure which otherwise would arise at points where the tubes touch, guiding optical modes with high resonances that lead to transmission loss. Hence this fibre type is also known as "nodeless fibre". A smaller size of the gaps g equates to an improved lower loss, since a larger gap allows guided light to escape from the core more easily, increasing the loss. Also, unequal gaps around the fibre produce a reduction in the usable air-mode guiding bandwidth.

Figure 2:
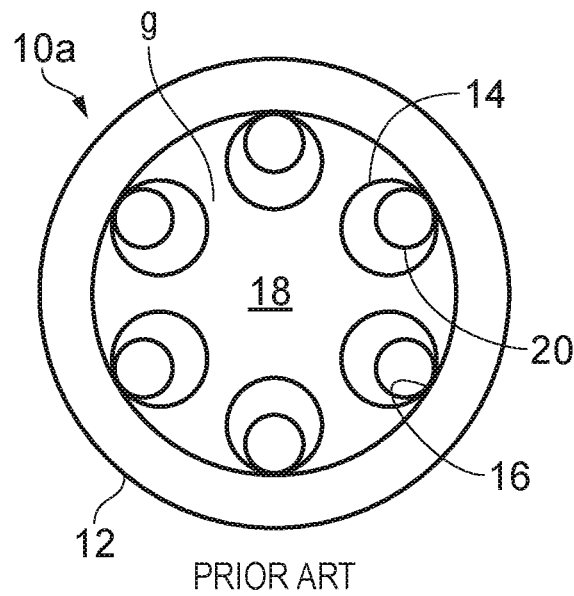
FIG. 2 shows a schematic cross-sectional view of a second example antiresonant hollow core optical fibre according to the prior art.

FIG. 2 shows a schematic cross-sectional view through a second example antiresonant hollow core fibre 10a. The fibre 10a comprises the same components as the FIG. 1 example, although only six antiresonant cladding tubes are included instead of seven. They are still equally spaced around the jacket, however, spaced apart by the gaps g. The fibre 10a additionally comprises a further smaller hollow cladding tube 20 inside each of the main cladding tubes 14. Each further cladding tube 20 contacts the inner surface of its main cladding tube 14 at a single point, which is in line with the point 16 at which the main cladding tube 14 contacts the inner surface of the jacket 12. Each group of one main cladding tube 14 and one further cladding tube 20 forms a nested pair of tubes aligned at the same azimuthal location, the azimuthal locations being equally spaced around the circumference of the jacket 12. The nested configuration allows further reductions in optical transmission loss, and leads to the designation of "nested antiresonant nodeless fibre (NANF)".

These example fibre structures are idealized, with correctly and regularly sized and spaced cladding tubes. To make these fibres, the various tubes are assembled together into a preform, each tube having the relative position in the preform which is required of it in the final fibre. Hence, the FIGS. 1 and 2 examples equally depict cross-sections of preforms as well as fibre cross-sections. Note that the depictions are schematic and not to scale. For example, in reality the wall thickness of the outer jacket tube 12 may or may not be thick or much thicker than the wall thicknesses of the cladding tubes 14, 20. The inner cladding tubes 20 may or may not have a wall thickness the same as that of the main cladding tubes 14, and the wall thicknesses may vary between the cladding tubes 14, 20 in some defined way to achieve a particular desired fibre structure.

As discussed in the background section, it is very difficult to maintain the relative positions of the tubes and their relative sizes and wall thickness as set in the preform throughout the fibre drawing process and into the finished fibre. Hence the gaps g may not be maintained at a desired size (such as the smallest possible size which in many configurations is optically desirable for minimum loss) throughout the fibre and the tubes may not keep an equal wall thickness, so the fibre will likely have a higher loss and lower bandwidth than intended. These defects may be both within a single cross-section through the fibre, and by variations in structure along the length of the fibre.

Figure 3:
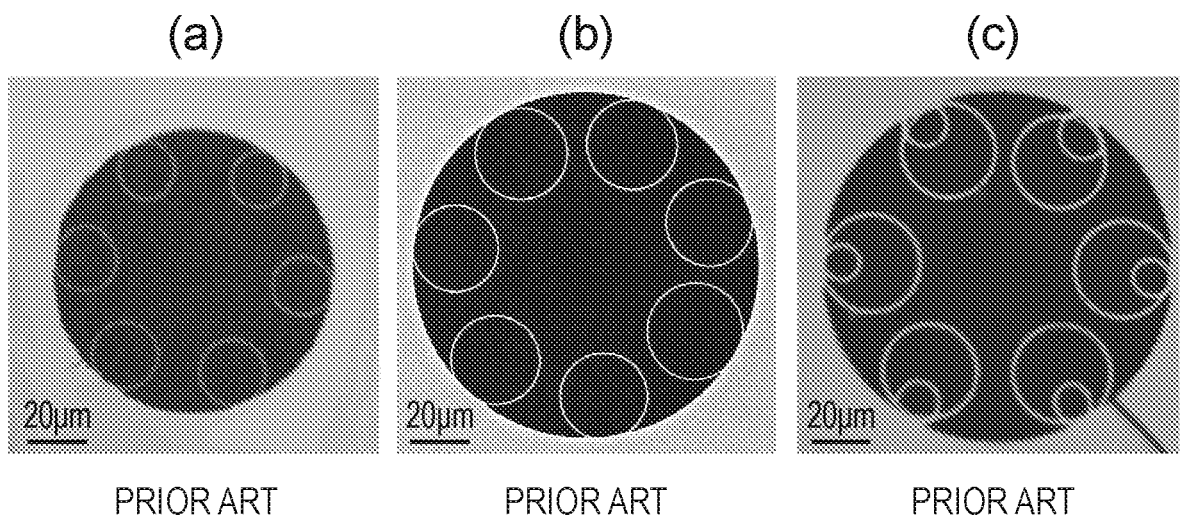
FIG. 3 shows images of antiresonant hollow core optical fibres fabricated according to prior art techniques.

FIG. 3 shows some cross-sectional images (from optical and scanning electron microscopes) of actual fabricated antiresonant hollow core fibres. FIG. 3(a) shows a fibre with six single non-touching cladding tubes, FIG. 3(b) shows a fibre with seven single non-touching cladding tubes, and FIG. 3(c) shows a fibre with six non-touching nested pairs of cladding tubes. In each case, and despite the utmost care having been taken in assembling the preforms with as much precision and uniformity as possible, the fibres include cladding tubes with non-symmetrical and irregular azimuthal positioning, unequal tube diameters, and locally varying tube wall thickness. These structural deficiencies reduce a fibre's optical performance, but are believed to be present in all reported examples of nodeless fibres with spaced apart cladding tubes, becoming more evident as the capillary thickness-to-size ratio decreases.

Embodiments of the present invention seek to address this issue by modifying the structure of the preform used to make an antiresonant hollow care fibre. The spaces or gaps between the antiresonant cladding tubes in the preform are occupied by spacing elements, while the antiresonant tubes themselves are maintained in the required non-touching configuration. Contact points are instead introduced between the antiresonant cladding tubes and the adjacent spacing elements. While this contact introduces nodes into the structure, which may seem undesirable, the surprising outcome is that if the contact points between the antiresonant cladding tubes and the interleaving spacing elements are located at a radial distance from the centre point (corresponding to the central longitudinal axis) of the outer jacket tube (corresponding also to the central longitudinal axis of the core, and of the preform as a whole) which is greater than the distance of the centre points (central longitudinal axes) of the antiresonant cladding tubes from the centre point of the outer jacket, a spectral region exists where the optical performance of the resulting fibre drawn from the preform is not adversely affected to any significant extent. The nodes introduced by the additional contact points may give rise to some higher loss resonances at longer wavelengths, but the impact that these have on the transmission loss of the fibre at shorter wavelengths of the antiresonant window is negligible compared to a fibre in which the antiresonant cladding tubes are touching, and the minimum loss is similar to that of a nodeless counterpart fibre.

The effect of the spacing elements placed alternately with the antiresonant cladding tubes and in contact with them is to hold the tubes in position during the drawing process, reducing sideways movement, rolling, flipping and twisting, and helping to maintain any inflation of the tubes more constantly across the tubes. In this way, both the position of the tubes and hence the regularity of the size of the gaps between the tubes, and the regularity of the size and thickness of the tubes is transferred more accurately from the preform into the completed fibre, and optical performance is improved compared to an equivalent fibre made from a preform without spacing elements. The spacing elements, which become an integral part of the completed fibre, are elongate in that they extend longitudinally throughout the length of the preform (in a continuous or discontinuous manner) to provide the required anchoring of the cladding tube positions over the full extent of the preform, cane or fibre.

In some examples, the combination of the spacing elements placed alternately with the antiresonant tubes is to provide as least one path around the interior of the preform which is continuously occupied by structural components (the cladding tubes and the spacing elements), with no gaps between these components. The preform is azimuthally tightly packed in a configuration such that the contact points between the antiresonant tubes and the spacing elements occur at a radial position larger than the distance of the centre of the antiresonant tubes from the centre of the jacket. Positions of the tubes are thereby secured and movement away from these intended positions during drawing is reduced. In other examples, the spacing elements may secure the position of the tubes by being themselves secured to the inner surface of the jacket tube. This provides the same anchoring of the tubes into the intended locations for successful translation of these locations into the finished fibre. Many forms of spacing element may be used to achieve the desired effect, as discussed further below.

Figure 4:
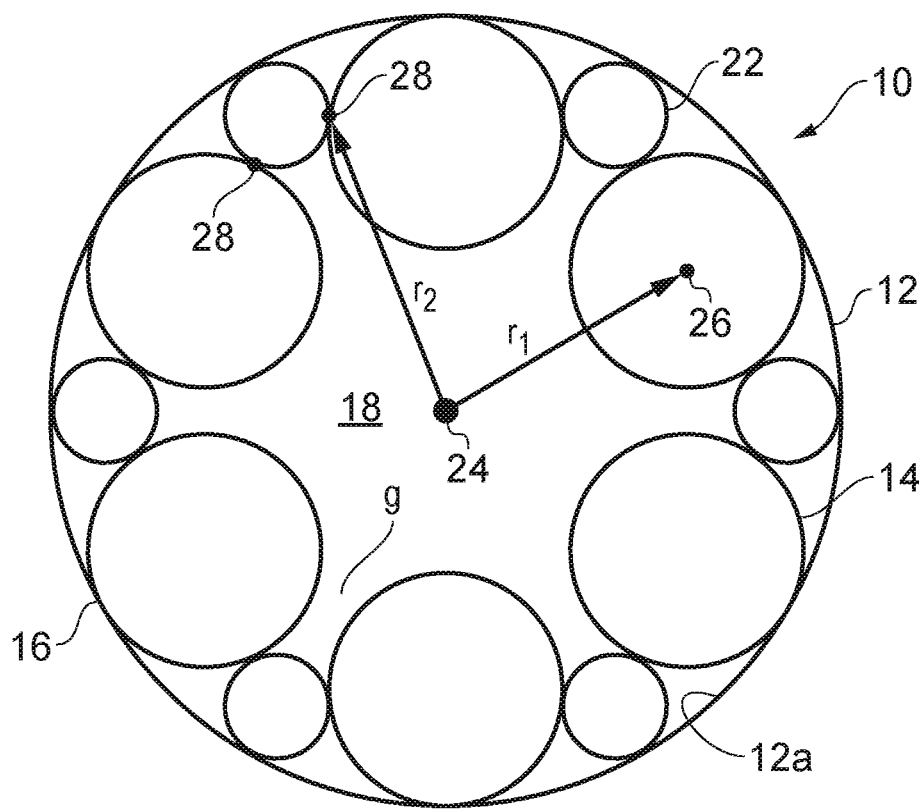
FIG. 4 shows a schematic cross-section of an example of a preform for fabricating an antiresonant hollow core optical fibre according to an aspect of the present disclosure.

FIG. 4 shows a schematic cross-sectional view of an example preform 10 with spacing elements 22. The preform 10 comprises six antiresonant cladding tubes 14 spaced equally around the inner surface 12a of the outer jacket 12, each in contact with this inner surface at a single azimuthal position 16. The tubes 14 are spaced apart from each other so that they are not in contact with their immediate neighbours, and are instead separated by gaps g. In this example, the tubes 14 are all the same diameter, and so the gaps g are all the same width. The open space or void within the ring of tubes 14 will become the core 18 of the finished fibre. The outer jacket 12 has a central longitudinal axis 24 (also the central longitudinal axis of the fibre 10 and the core 18). Each cladding tube 14 also has its own central longitudinal axis 26. In the completed fibre, it is desirable that these axes 26 are parallel to each other and to the axis 24 of the jacket 12. Typically the cladding tubes extend continuously through the length of the outer jacket tube, having the same or a similar length thereto.

The spacing elements 22 in this example comprise further hollow tubes, for example made of glass. One spacing element 22 is inserted between each adjacent pair of cladding tubes 14. The spacing elements 22 have a smaller diameter than the cladding tubes, so that they fit into the space bounded by two adjacent cladding tubes 14 and the outer jacket 12. Each spacing element 22 is sized and positioned so that it touches both of the cladding tubes which it sits between, at contact points 28. In this example, each spacing element is also in contact with the inner surface 12a of the outer jacket 12 at a single point (similar to the contact between the cladding tubes 14 and the jacket 12), and since the tubes are circular in cross section, each tube touches each adjacent cladding tube at only one contact point 28. Typically, the spacing elements will have a smaller diameter or width than the cladding tubes, but this may not always be true, particularly where spacing elements of non-circular cross-section are used (discussed further below). Also, in many cases the spacing elements extend continuously through the length of the outer jacket tube, having a same or similar length as the outer jacket tube and the cladding tubes. The spacing elements are a permanent part of the preform, and fuse with the other components during drawing of the preform in a finished fibre to become an integral part of the fibre. Hence, they are distinct from temporary or incidental packing elements that are sometimes stuffed into the ends of a preform to make the packing of the various parts more tight.

The central axis 26 of each antiresonant cladding tube 14 is separated from the central axis 24 of the outer jacket 12 by a first radial distance r1. Since all the tubes are the same size in this example, all tubes have the same value of r1. The contact points 28 between the spacing elements 22 and the cladding tubes 14 are at a second radial distance r2 from the central axis 24 of the jacket 12. The second radial distance is greater than the first radial distance. i.e. r2>r1.

The presence of the spacing elements 22 and their positions in contact with the cladding tubes 14 serves to maintain the cladding tube positions during drawing of the preform into a fibre. The contact points 28 produce nodes, but their position further from the fibre's central axis 24 than the axes of the cladding tubes 24 means that resonances arising from these nodes do not impact significantly on the optical performance of the fibre.

Figure 4A:
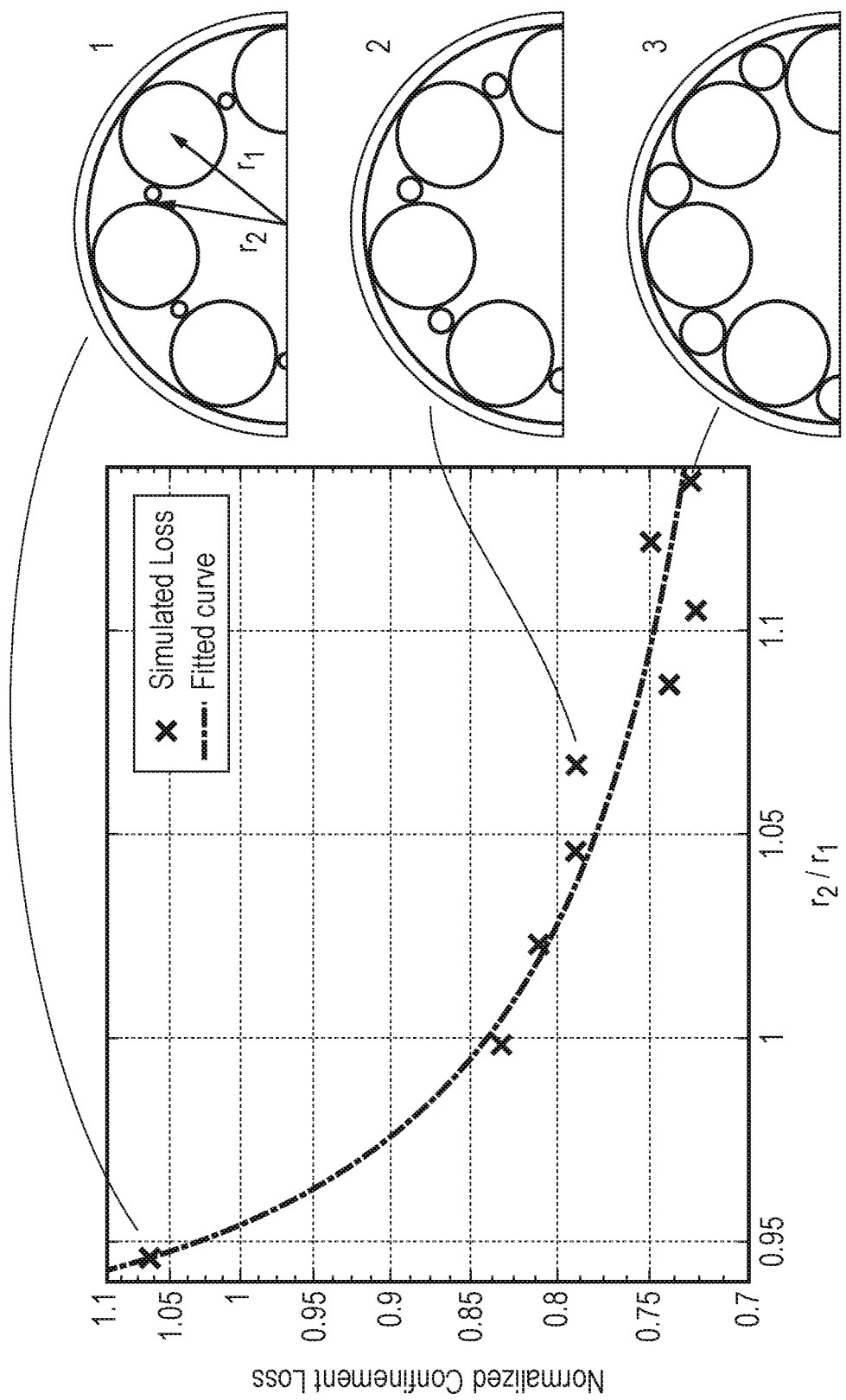
FIG. 4A shows a graph of optical loss as a function of a ratio r2/r1 defined for preforms according to examples of the disclosure.

FIG. 4A shows a graph demonstrating how loss can be reduced by applying the r2>r1 relationship. The graph shows loss (as normalized confinement loss) as a function of r2/r1, with a curve fitted to a set of loss values simulated for a range of preform structures in which r2 is varied. Propagating wavelength is constant, as is the size and spacing of the cladding tubes so that the r1 distance is constant. The structures of three example preforms are illustrated, mapped to their corresponding points on the graph. These are Example 1 in which r2 is actually less than r1, Example 2 in which r2 is slightly greater than r1 so that r2/r1 is 1.045, and Example 3 in which r2 is made larger so that r2/r1 is about 1.135. Note that the circular spacing elements increase in diameter as r2 increases, in order to maintain the contact between each spacing elements and its two adjacent cladding tubes. The graph shows how the optical quality (where a lower confinement loss indicates superior quality) is affected by changes in the r2 value, in that increasing the r2 value by moving the contact point further from the central axis of the outer jacket improves the performance of the fibre. Note the dramatic reduction in loss on changing from a r2 value less than r1 to a r2 value greater than r1, corresponding to taking the r2/r1 ratio from below 1 (such as in Example 1) to above 1 (such an in Example 2). Further increases in the r2/r1 value serve to further reduce the loss. In this simulation, the maximum performance (least loss) is from a fibre in which each circular spacing elements is in contact with the two adjacent cladding tubes and also the inner surface of the outer jacket (Example 3). It is anticipated that a further reduction in loss would occur by changing to non-circular spacing elements that enlarge the r2 distance.

Figure 5:
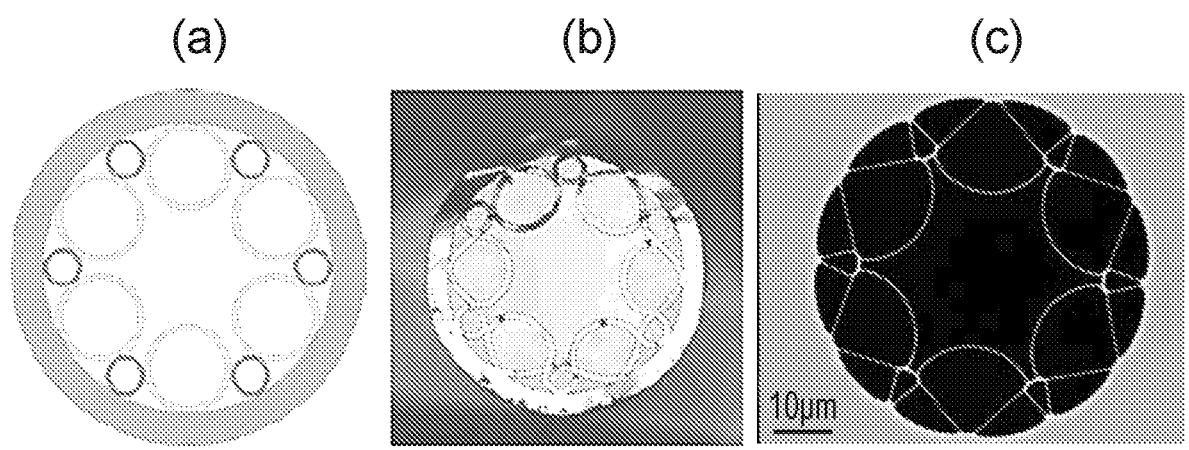
FIG. 5 shows images of a preform, a cane and an optical fibre according to aspects of the present disclosure.

FIG. 5 shows images of preforms and fibres to demonstrate the practical effect of spacing elements. FIG. 5(a) shows a cross-sectional schematic view of a preform having six antiresonant cladding tubes alternating with six tubular spacing elements to hold the cladding tubes in place. FIG. 5(b) shows an optical microscope image of a cross-section through a cane (intermediate stage of the fibre drawing) pulled from a preform such as that of FIG. 5(a). FIG. 5(c) shows a scanning electron microscope image of a cross-section through a fibre produced by drawing the cane of FIG. 5(b). From this it is possible to appreciate that the regular and symmetrical positioning and spacing of the cladding tubes in the preform is well-preserved after drawing in the fibre. This is owing to the spacing elements contributing to reduce or prevent movement of the cladding tubes about their single contact point with the inner wall of the jacket. The gaps between the antiresonant cladding tubes are uniform in the finished fibre, and their size can be controlled very accurately by use of suitably sized spacing elements. It will be observed that in the fabricated fibre the cladding tubes have assumed a circular sector shape and the spacing elements have assumed a triangular shape. This is owing to pressurization of the various tubes and voids in the preform/cane during the drawing process. Pressure differentials between different groups of components can be used to control the fibre structure by inflating or deflating the components compared to the shape they would adopt without pressure differentials. The cladding tubes in the finished fibre each have the same, regular shape, as do the spacing elements.

Figure 6:
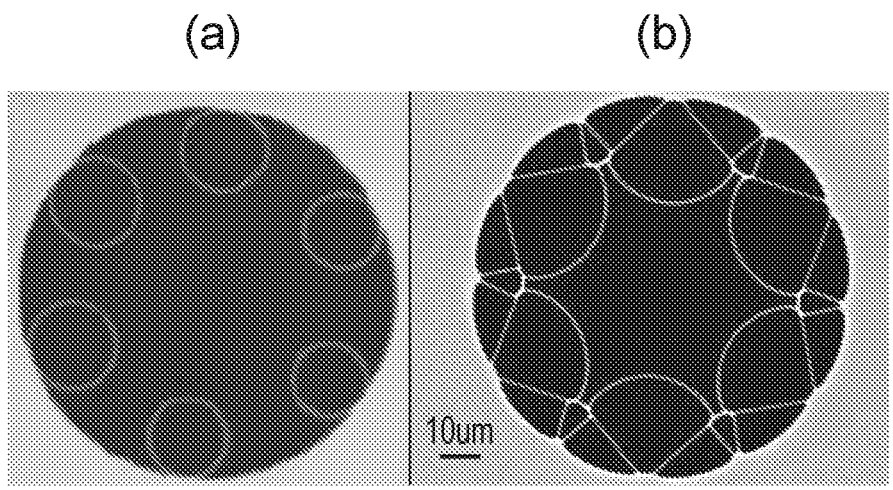
FIG. 6 shows, for comparison purposes, an image of a prior art fibre from FIG. 3(a) and of the example fibre from FIG. 5(c)

FIG. 6 shows a comparison between the fibre of FIG. 3(a) that lacks spacing elements, and the fibre of FIG. 5(c) that includes spacing elements. This highlights the improvement offered by the spacing elements. The previous fibre suffers from unequal cladding tube size and asymmetric cladding tube positioning, while these defects are corrected by the spacing elements keeping the cladding tubes in position.

Figure 7:
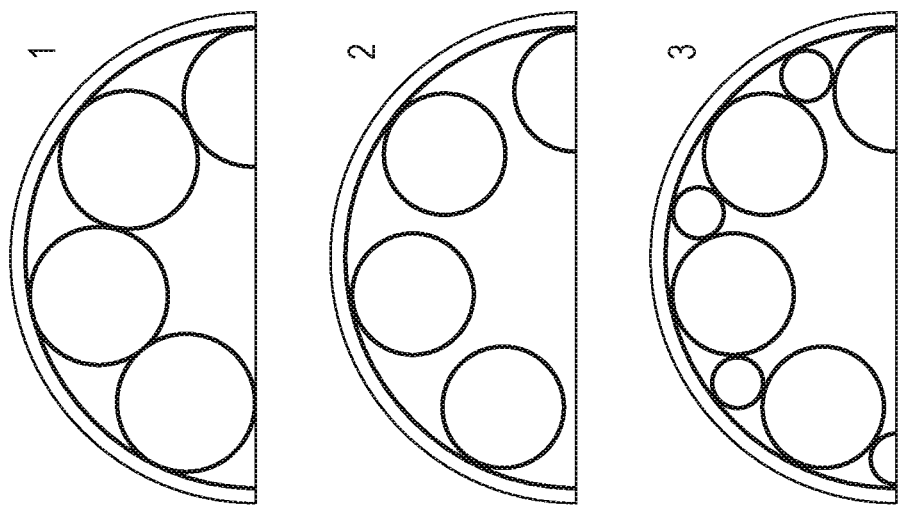
FIG. 7 shows a graph of the variation of attenuation with wavelength for two fibres according to the prior art and a fibre according to an example of the present disclosure.
Figure 7:
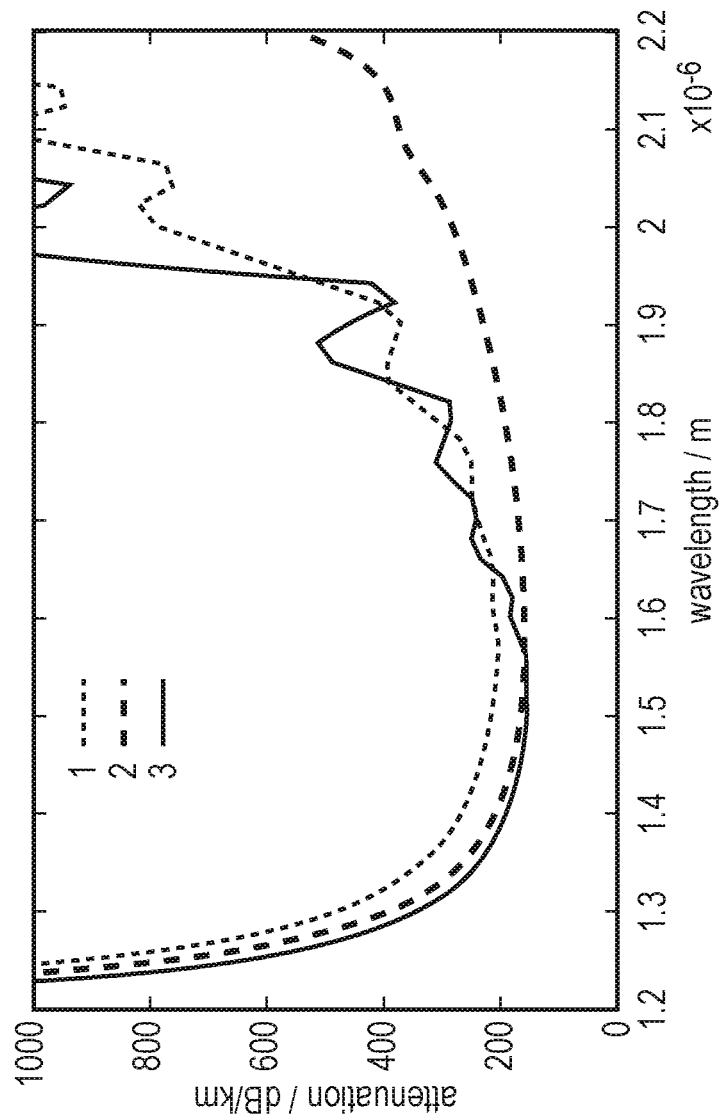

FIG. 7 presents data demonstrating the quality optical performance obtainable from fibres made from preforms including spacing elements. Shown on the right of the Figure are three modelled example fibre structures (in cross-section). Example 1 is an antiresonant hollow core fibre comprising a ring of antiresonant tubes which are touching; this configuration is known to have losses arising from resonance at the nodes enabled by the contact points between the tubes. Example 2 is a fibre in which the antiresonant tubes are spaced apart from other, where the gaps between the tubes are known to reduce transmission losses by removing the nodes of the contact points. Example 3 is a fibre according to the present disclosure, with spacing elements inserted between the antiresonant tubes. Aside from these differences, the parameters modelled are the same in each case.

On the left of FIG. 7 is a graph of attenuation in dB/km (in other words, the amount of transmission loss) against transmission wavelength obtained from a computer simulation. Curves for each of the three examples are shown, as a dot-dash line for Example 1, a dashed line for Example 2 and a solid line for Example 3. From this we can observe how the spacings introduced in Example 2 reduce the attenuation compared to the Example 1 fibre; the attenuation is less at all wavelengths, and substantially reduced at longer wavelengths, to give a wider useable bandwidth. Example 3 shows similar (and indeed slightly less) attenuation to Example 2 at wavelengths below about 1550 nm, indicating that the contact points of the spacing elements do not have a detrimental effect on transmission losses. At longer wavelengths, the attenuation is closer to that of the Example 1 fibre, showing that the bandwidth is comparable, and offers a good transmission window at typical wavelengths of interest for fibre communications (around 1550 nm). However, recalling that in reality the Example 2 fibre will suffer positional defects from the drawing process and will lack the precise structure of the model, actual losses in a real fibre of this type will generally be higher and the bandwidth narrower, whereas a real Example 3 fibre will better approximate the structure of the model and will likely to have similar attenuation to that shown in the graph. Hence, a real fibre according to Example 3 will likely have better optical performance than a real Example 2 fibre. Hence, the use of spacing elements is beneficial in improving fibre characteristics.

The examples above use single hollow tubes as the spacing elements. While these are convenient owing to their similarity with existing fibre components, the disclosure is not limited in this regard, and many different shapes and configurations of spacing element are envisaged. Each spacing element makes contact with its two neighbouring antiresonant tubes at contact points which are at a greater radial distance from the preform central axis than the centres of the antiresonant tubes, and any shape and configuration which achieves this may be used. Size of the spacing elements can be elected with regard to the number and size of the antiresonant tubes and the desired gap between them, since these parameters determined with size of the space which accommodates the spacing element. Hence a wider gap can be achieved using a spacing element which is wider in the azimuthal direction (around the perimeter or circumference of the preform), and conversely for a narrow gap. The depth of the spacing element in the radial direction may affect the distance r2 of the contact points from the jacket central axis and might be selected as shallow to increase this distance with a view to minimising losses from node resonances at the contact points. In other cases a deeper spacing element that gives a smaller r2 distance might be acceptable from a higher loss perspective but with the advantage of providing a more secure anchoring of its adjacent antiresonant tubes.

Figure 8:
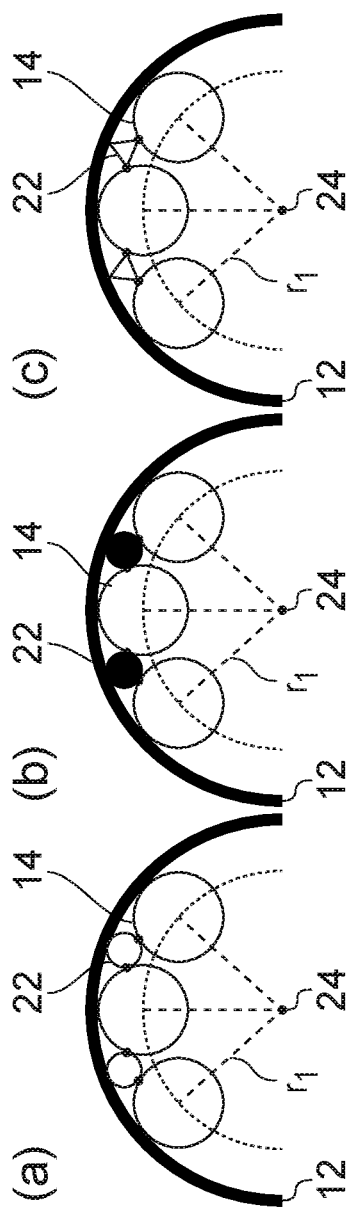
FIG. 8 shows schematic cross-sections of parts of preforms with spacing elements according to some examples of the present disclosure.

FIG. 8 shows schematic representations of some further example preforms with various spacing elements. The preforms are in cross-section, and for simplicity, only a part of each is shown, including three antiresonant tubes 14 and their interleaved spacing elements 22. The contact points are indicated by small dots. The dashed lines show the distance r1 from the jacket centre 24 to the antiresonant cladding tube centres, which are connected by a dotted curve to show that the contact points lie further away from the jacket centre 24. FIG. 8(a) shows an example like the previous examples, in which the spacing elements 22 are circular hollow tubes. FIG. 8(b) shows an example in which the spacing elements 22 are circular but comprise solid rods instead of hollow tubes. FIG. 8(c) shows an example in which the spacing elements 22 comprise triangular cross-section hollow tubes (these might alternatively be solid rods). Triangular spacing elements might take any triangular shape (equilateral, scalene, isosceles), shaped and sized to fit the available space while locating the contact points where desired. In this way triangular elements might be considered more flexible than circular elements. Other cross-sectional shapes may also be used.

Figure 9:
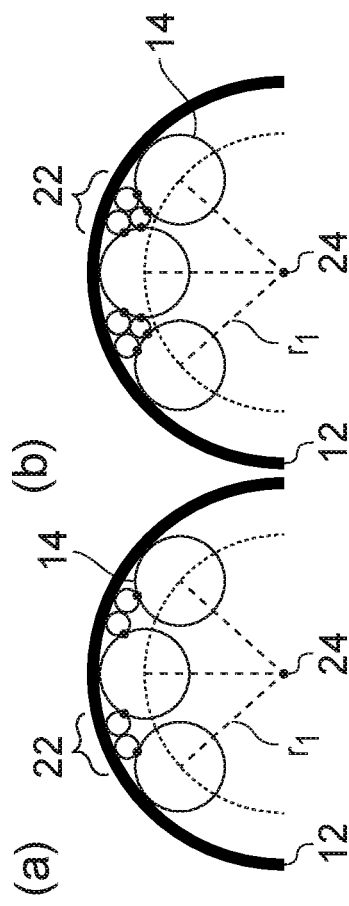
FIG. 9 shows schematic cross-sections of parts of preforms with spacing elements according to other examples of the present disclosure.

FIG. 9 shows schematic representations of more example preforms. The spacing elements are not limited to comprising a single component, and may alternatively comprise a group of sub-elements arranged together (in contact) to act as a single spacing element. This may be useful in achieving a spacing element of a more complex shape from readily available simpler elements, for example, or for creating a spacing element to fill a space from elements which alone would be too small to contact both neighbouring antiresonant tubes. FIG. 9(b) a shows an example in which each spacing element 22 comprises a group of two circular hollow tubes arranged in contact and side-by-side against the inner surface of the outer jacket 12. This grouping gives a shallow spacing element that moves the contact points further from the jacket's central axis 24. More than two sub-elements could be lined up in this way, with the contact points provided by the two sub-elements at the ends of the group. FIG. 9(b) shows an example in which each spacing element 22 comprise a group of three circular hollow tubes arranged in contact in a triangular grouping. This shape gives two contact points with each adjacent antiresonant tube 14, but all contact points are more remote from the jacket centre 24 than the antiresonant cladding tube centres. In other examples, larger numbers of sub-elements may be grouped to form a spacing element, and the group may include sub-elements of shapes other than circular, and which are solid rods rather than tubes. Also, sub-elements of different sizes, shapes and configurations may be combined into a single spacing element.

Figure 10:
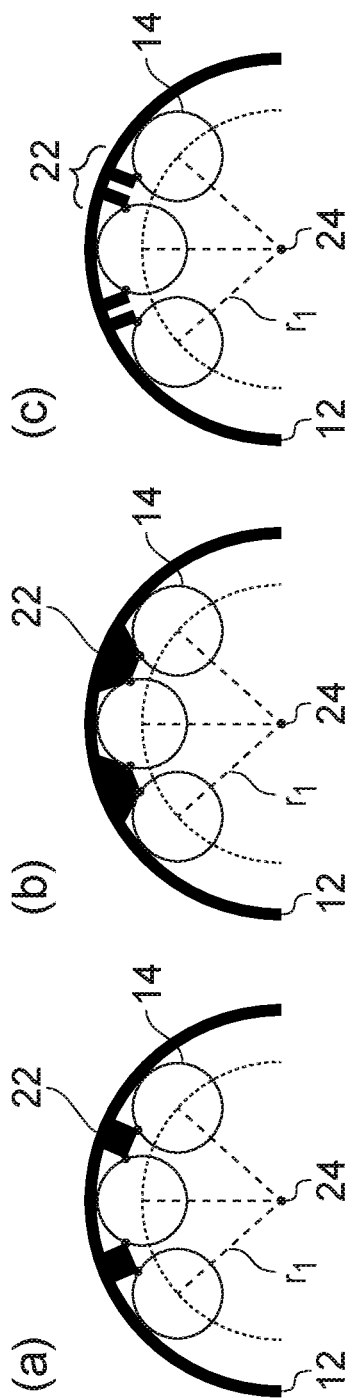
FIG. 10 shows schematic cross-sections of parts of preforms with spacing elements according to further examples of the present disclosure.

FIG. 10 shows schematic representations of further examples. The spacing elements are not limited to being separate components that are stacked into the preform between the antiresonant rods. They may instead be formed integrally with the outer jacket as protrusions extending inwardly from the inner surface of the outer jacket, thereby defining concave cradle areas into which the antiresonant tubes can be placed or slotted. The spacing elements might be formed separately and bonded onto the inner surface to create an integral structure with the outer jacket, or the outer jacket might be formed to include protruding portions (such as by moulding) or the inner surface might be machined or otherwise worked on to remove material and create concave areas, leaving spacing elements as convex protrusions between the concavities. FIG. 10(a) shows an example in which the spacing elements 22 have a simple square or rectangular cross-section protruding from the inner surface of the outer jacket 12. Each spacing element 22 contacts the adjacent cladding tubes 14 at two corners. FIG. 10(b) shows an example in which the inner surface is shaped with a series of alternating concavities to receive the cladding tubes 14 and convex protrusions 22 to space the tubes 14 apart and secure them in their azimuthal positions. In this case, the spacing elements 22 may make contact with the cladding tubes 14 over a relatively wide area. When the spacing elements are integral with the outer jacket, there is no requirement that they extend completely over the azimuthal space between the cladding tubes. The required anchoring can be provided by discrete sub-elements protruding from the inner wall only immediately adjacent to the cladding tubes. Each sub-element has a contact point or points with only one cladding tube, and the sub-elements are spaced apart in pairs between each pair of adjacent cladding tubes, each pair of sub-elements being a group making a spacing element. FIG. 10(c) shows an example of this kind.

Figure 11:
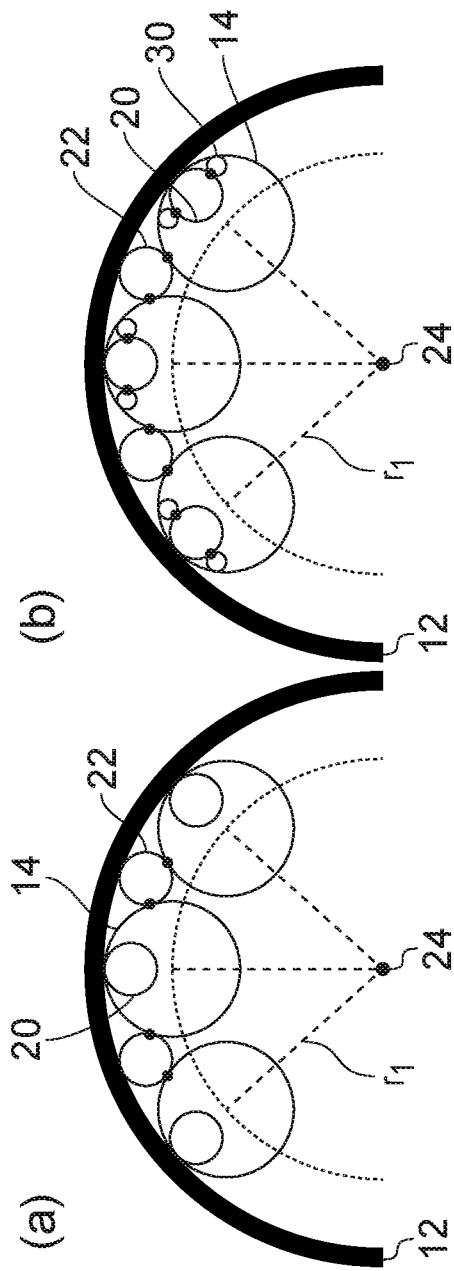
FIG. 11 shows schematic cross-sections of parts of preforms with spacing elements according to still further examples of the present disclosure.

The use of spacing elements can also be applied to preforms for more complex antiresonant hollow core fibre structures, such as fibres including nested antiresonant cladding tubes. FIG. 11(a) shows an example in which each cladding tube 14 has nested within it a smaller additional antiresonant cladding tube 20, with the same azimuthal alignment to the outer jacket 12. Spacing elements 22 are included between the main cladding tubes 14 as before. Further nested tubes may be included, in configurations such as additional nested levels, or two or more tubes arranged adjacently to each other inside a larger cladding tube. The term "nested" is intended to include any such arrangement of one or more cladding tubes inside a larger cladding tube. For fabrication purposes, a nested group might be pre-assembled or pre-fabricated into a single unit before being inserted inside the outer jacket of the preform, or might be assembled in situ by inserting the various cladding tubes individually into the outer jacket. As shown in FIG. 11(b), the additional antiresonant cladding tubes may also be secured in their nested positions by spacing elements placed inside the main cladding tube. In this case, since the additional cladding tubes are present individually rather than in a ring, each spacing element has a contact point with only one additional cladding tube, and a spacing element is provided on each side of the additional cladding tube so the tube has a contact point on each side to stabilise its position and inhibit movement as before. These contact points are further from the jacket centre point 24 than the first radial distance r1. The spacing elements are also in contact with the inner surface of the respective main cladding tube 14.

Figure 12:
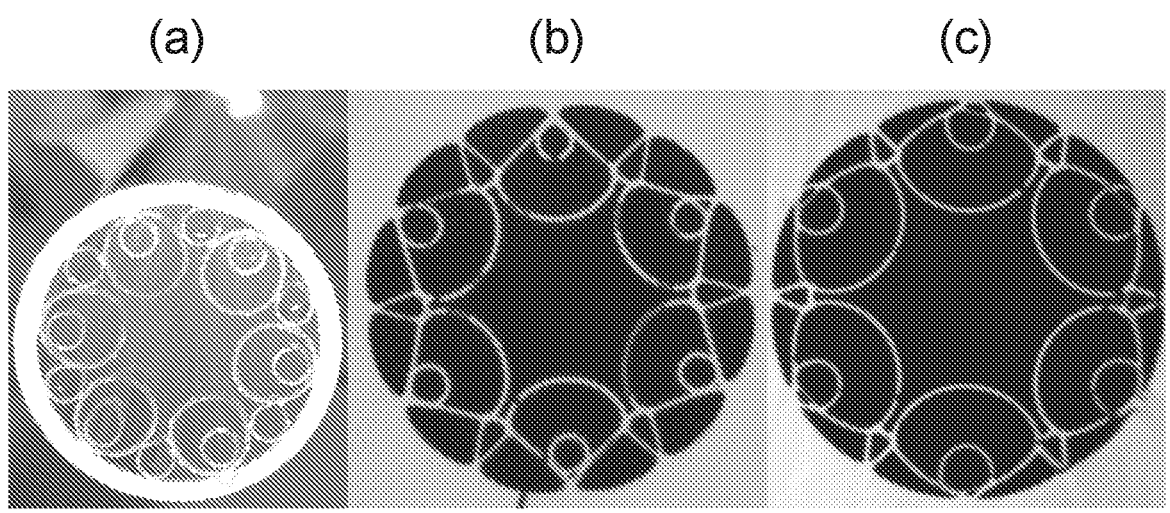
FIG. 12 shows images of a preform according to an example of the present disclosure and of two example fibres drawn from the preform.

FIG. 12 shows images of a preform and fibres incorporating nested tubes. FIG. 12(a) shows a camera image of a preform comprising six evenly-spaced nested pairs of antiresonant cladding tubes alternated with six circular hollow tube spacing elements. FIGS. 12(b) and (12c) show microscope images of two fibres pulled from this preform, using different pressurization regimes to modify the shape and size of the various tubes. Note that the spacing tubes allow a good azimuthal uniformity to be achieved in the finished fibres, together with very similar element sizes across the fibre.

Figure 13:
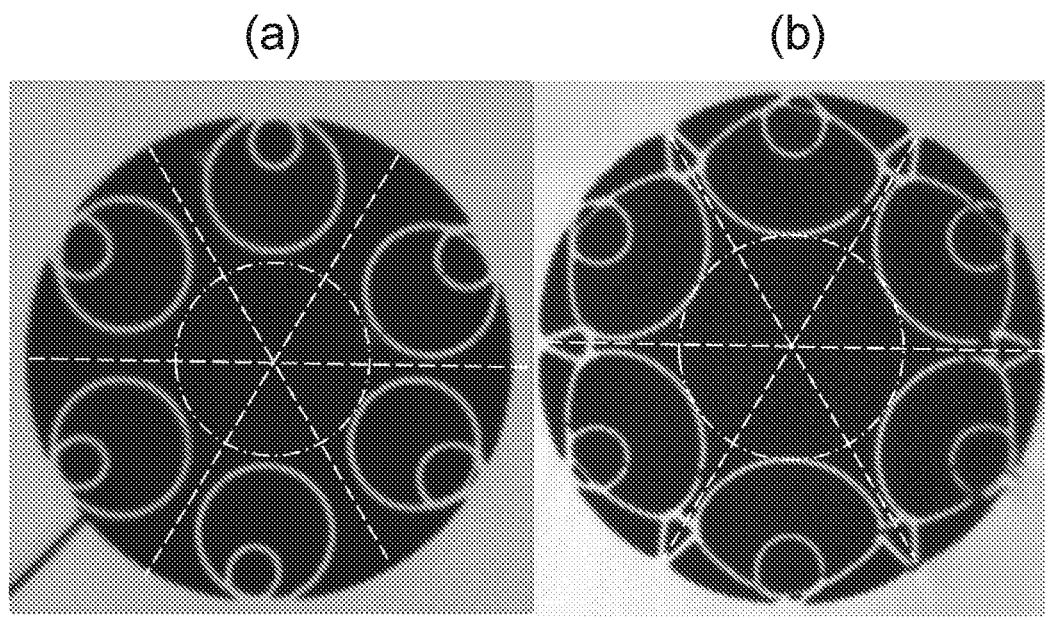
FIG. 13 shows, for comparison purposes, an image of a prior art fibre from FIG. 3(c) and of the example fibre from FIG. 12(c)

FIG. 13 repeats the image of FIG. 12(b) next to an image (FIG. 13(a)) of a six nested-tube fibre drawn from a preform without spacing elements. Dotted lines are superimposed to divide the images into 60° sectors to emphasize the more consistent sizes and spacings of the FIG. 13(b) fibre compared to the FIG. 13(a) fibre.

The preforms are not limited to those assembled from tubes of a circular cross-section. Any of the jacket and/or cladding tubes may be otherwise shaped, such as oval, tear-shaped, square, hexagonal, or other polygons (regular or irregular). As is evident from FIGS. 12(b) and 12(c), the use of pressurization during the fibre drawing can also be used to modify the shapes of the various components.

As will be evident from the preceding examples, the disclosure is not limited with regard to the number of antiresonant cladding tubes or nested groups of cladding tubes that are included in the preform/fibre. Any number may be included depending on the optical characteristics required from the fibre. Five, six, seven and eight tubes are commonly comprised in antiresonant hollow core fibres, but fewer or more tubes are not excluded. For example, four tubes might be used to provide an orthogonal symmetry for polarisation effects.

Polarising and polarisation-maintaining (birefringent) optical fibres are known, being fibres with an engineered difference or asymmetry between two or more diametric directions across the fibre cross-section which can either induce a particular polarisation in incident light or maintain an exiting polarisation in propagating light. In the case of antiresonant hollow core fibres, the asymmetry can be provided by using differently sized, shaped or structured antiresonant cladding tubes or nested groups of tubes in two groups arranged symmetrically along two orthogonal axes across the jacket tube [5, 6]. For example, four anti-resonant cladding tubes can be arranged equally spaced at 90° azimuthal intervals in two pairs, where opposite tubes have the same configuration and the two pairs have a different configuration. This gives an orthogonal asymmetry with different amounts of transmission loss for light polarised along the two directions corresponding to the two cladding tube pairs, so that the guided mode exhibits high birefringence or one polarisation is supported while the other is dissipated or reduced. The spacing elements disclosed herein can be utilised in preforms to make such fibres, and indeed may be particularly valuable since the inclusion of just four cladding tubes necessarily gives a relatively large gap between the tubes so that a great deal of movement is possible during drawing. Spacing elements can be added to suppress this movement and produce polarisation-maintaining and polarising fibre with more accurately positioned components and hence an improved optical performance.

Figure 14A:
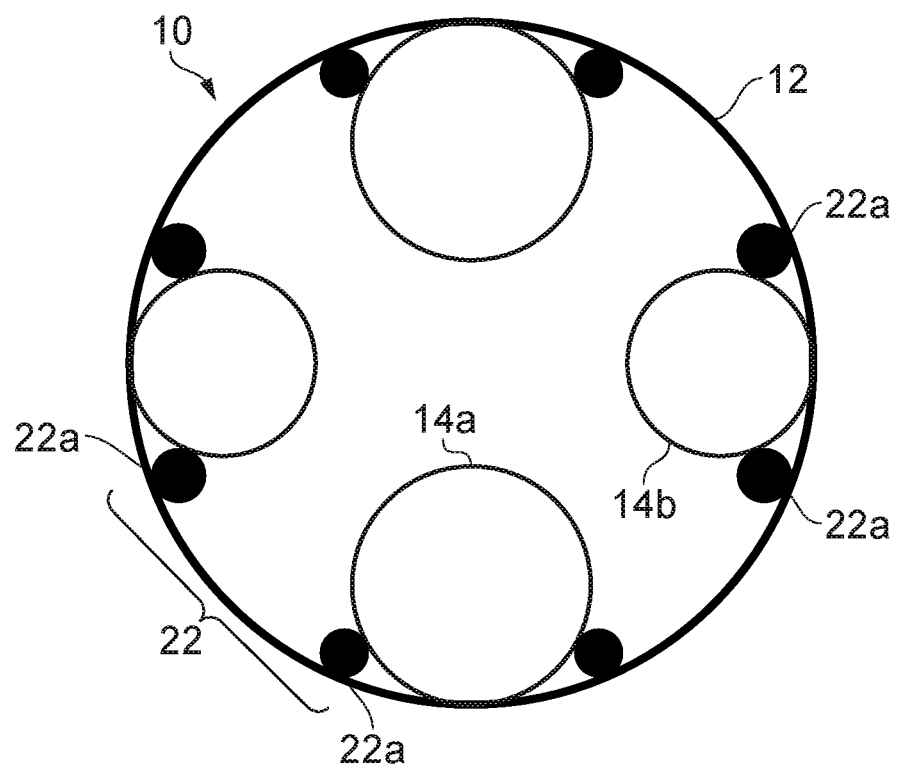
FIGS. 14A, 14B and 14C show schematic cross-sectional views of example polarisation-maintaining antiresonant hollow core optical fibres according to examples of the present disclosure.

FIG. 14A shows a schematic cross-sectional view of an example of a preform for a polarisation-maintaining fibre. The fibre 10 includes an outer jacket 12, against the inner surface of which are placed four antiresonant cladding tubes 14a, 14b. Each cladding tube 14a, 14b has a spacing sub-element 22a at each side, in contact with the outer surface of the tube, to secure its azimuthal position. There are two spacing sub-elements 22a between each cladding tube, the two comprising a group making up a single spacing element 22. The cladding tubes are of two different sizes and are evenly spaced apart and arranged in opposite pairs so the two larger tubes 14a are opposite each other, and the two smaller tubes 14b are opposite each other along an orthogonal direction to the larger tubes 14a. The different sizes of the cladding tubes can give either high birefringence or different levels of optical transmission loss for light polarised along the two orthogonal directions, so that one polarisation can be maintained while the other is lost or attenuated. Many other configurations of cladding tubes (nested and not nested) can be used to provide an equivalent orthogonal loss differential for maintaining light polarisation.

Figure 14B:
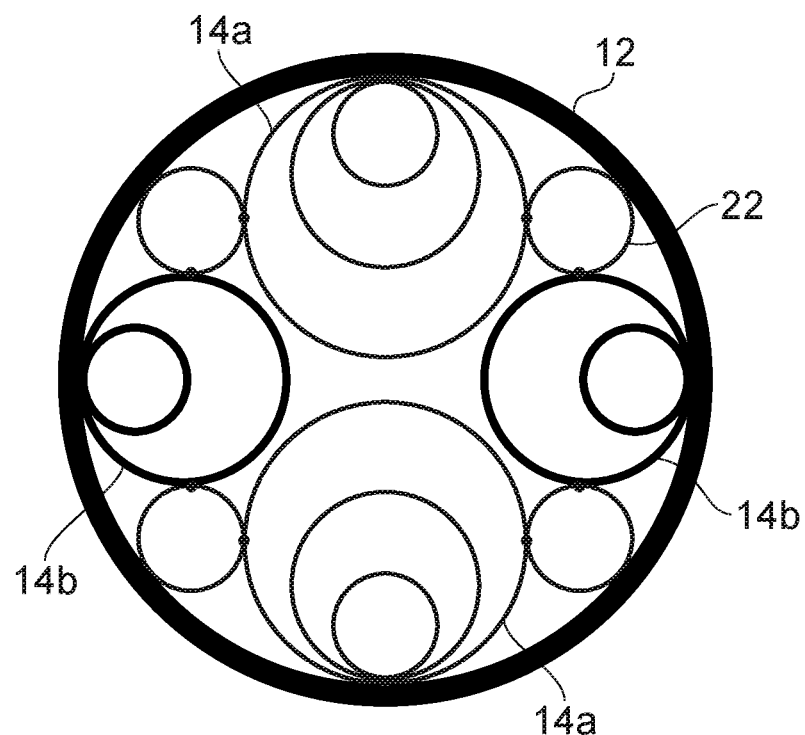

FIG. 14B shows a schematic cross-sectional view of an alternative example preform for a polarisation maintaining fibre. In this example, two orthogonally-arranged pairs of antiresonant cladding tube structures 14a, 14b are used as in the FIG. 14A example. However, the cladding tubes are more complex, with one pair 14a each comprising three nested tubes of decreasing diameter, and the other pair 14b comprising two nested tubes of decreasing diameter. The asymmetry required for birefringence is provided in part by this difference in the number of nested tubes, but also in the diameter and wall thickness of the cladding tubes. The triple nested cladding tubes 14a have a larger outside diameter (diameter of the outer cladding tube) and thinner wall thickness that the double nested tubes 14b. The spacing elements 22 comprise individual circular tubes each in contact with both of the adjacent cladding tube nests 14a, 14b and the outer jacket tube 12. This is in contrast with the FIG. 14A example where each spacing element 22 comprises a group of two spaced-apart spacing sub-elements 22a.

Figure 14C:
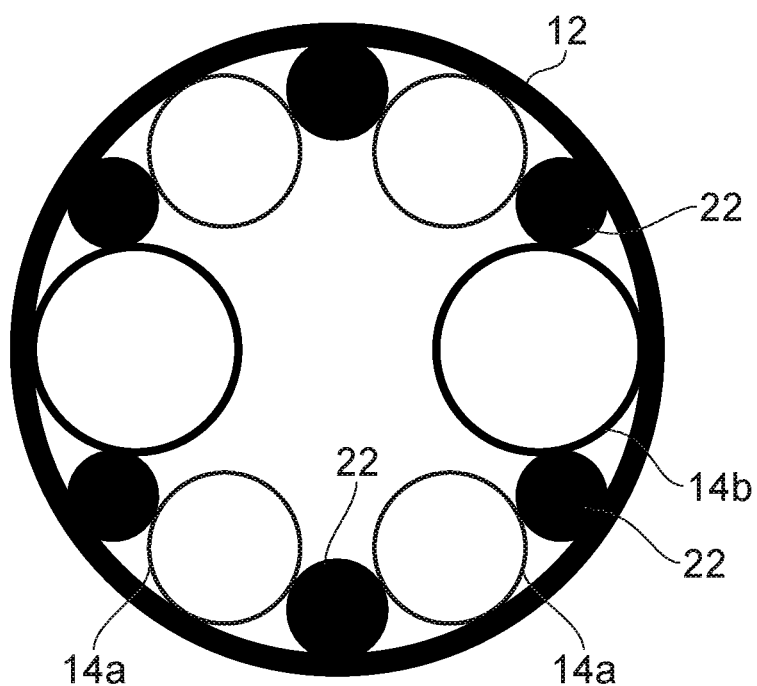

FIG. 14C shows a schematic cross-sectional view of a further example preform for a polarisation-maintaining fibre. In this example, six antiresonant cladding tubes are used, divided into a first group of two larger and thicker-walled cladding tubes 14b and a second group of four smaller and thinner-walled cladding tubes 14a. Each group is orthogonally arranged to each other as before, in addition to all six tubes 14a, 14b being spaced apart from the two neighbouring tubes around the inner surface of the outer jacket 12. Spacing elements 22 in the form of circular cross-section solid rods are alternated between the cladding tubes 14a, 14b, each in contact with its two adjacent cladding tubes 14a, 14b and the inner surface of the outer jacket tube 12.

When circular tubes and elements are used in a preform, it is clear where the central longitudinal axis of a tube lies. For other shapes having rotational symmetry, the centre can be considered as being the axis of rotational symmetry. For more complex shapes, such as the sector or wedge-shaped antiresonant cladding tubes of the examples in FIGS. 5, 6 and 12, we can define the central longitudinal axis of the cladding tube (for the purpose of defining the first radial distance r1) as lying along a radius of the fibre that extends to the position where the cladding tube contacts the jacket wall, and at the location which is midway between that contact position and the place where the radius passes through the inwardly-facing side of the cladding tube that bounds the core.

In some cases, a preform may be deliberately structured with main cladding tubes of more than one size. The first radial distance r1 will therefore not be the same for every cladding tube. Therefore, we might take an average value of r1 across all the cladding tubes for the purpose of comparing the first and second radial distance. Similarly, if the cladding tubes and/or the spacing elements are differently sized or shaped within a single preform or fibre, the second radial distance r2 may not be the same for every contact point. To compare the radial distances in this situation, the second radial distance r2 for each contact point could be compared with the first radial distance r1 for the cladding tube on which that contact point is located. In a further alternative, if there is a range of second radial distances, either from different spacing elements, or spacing elements with multiple contact points (such as in FIG. 9(a)), the comparison may check that every individual value of r2 is greater than the value of r1 (a single or average value). Or, an average of all r2 values can be compared with an average of all r1 values.

The examples shown so far have all included spacing elements which are not only in contact with the adjacent cladding tubes, but are also in contact with the inner surface of the outer jacket. This is not required, however, and spacing elements which make contact with the cladding tubes but not with the outer jacket are also contemplated.

The spacing elements included in a preform fuse or bond with the components in which they are in contact to become an integral part of the optical fibre, so should be made from materials suitable for fibre fabrication, such as materials from which the outer jacket tube and the cladding tubes can be formed. Some examples discussed herein have referred to preforms, canes and fibres made from glass, and in the field of optical fibres, this is generally intended to refer to silica and "silicate glasses" or "silica-based glasses", based on the chemical compound silica (silicon dioxide, or quartz), of which there are many examples. The various tubes or capillaries in a single preform, cane or fibre may be made from the same glass or from different glasses. The glass or glasses may include one or more dopants for the purpose of tailoring the optical properties, such as modifying absorption/transmission or enabling optical pumping. Also, the glass or glasses may include one or more dopants for the purpose of tailoring the material properties, such as modifying the fictive temperature, surface tension, viscosity, and/or chemical properties such as the water or chlorine content and associated chemical reactivity. Herein, the term "glass" is intended to refer to any material having appropriate physical and optical properties such that an optical fibre can be made from it according to the methods described herein, and while silicate glasses fall within this, other glass or glass-like materials may be used if they have the necessary properties; in general, a glass is a non-crystalline amorphous solid which exhibits a glass transition when heated towards the liquid state. This can include, for example, plastics and polymers.

The spacing elements may be made from the same material as other components of the preform, cane or fibre, or from a different material, and may or may not all be made from the same material. Also, the spacing elements may be included over the full length of the preform, either as single components, or a number of components abutting end to end. Alternatively, adequate anchoring of the cladding tubes might be obtained by short lengths of spacing element added at intervals along the length of the preform.

When the various tubes and spacing elements have been assembled as a preform of the desired structure, they may be permanently or temporarily secured in their positions within the outer jacket preparatory to pulling the preform into a cane or fibre. It may be that the spacing elements provide sufficiently tight packing around the interior of the jacket that no securing steps are needed. Alternatively, bonding may be achieved by the application of heat to fuse the various elements in place. As a further alternative, a plug or other packing material or element can be inserted a short distance into each end of the preform to occupy the core void and press the cladding tubes outwardly against the inner surface of the jacket tube. Accordingly, also disclosed herein a method for fabricating a preform.

Figure 15:
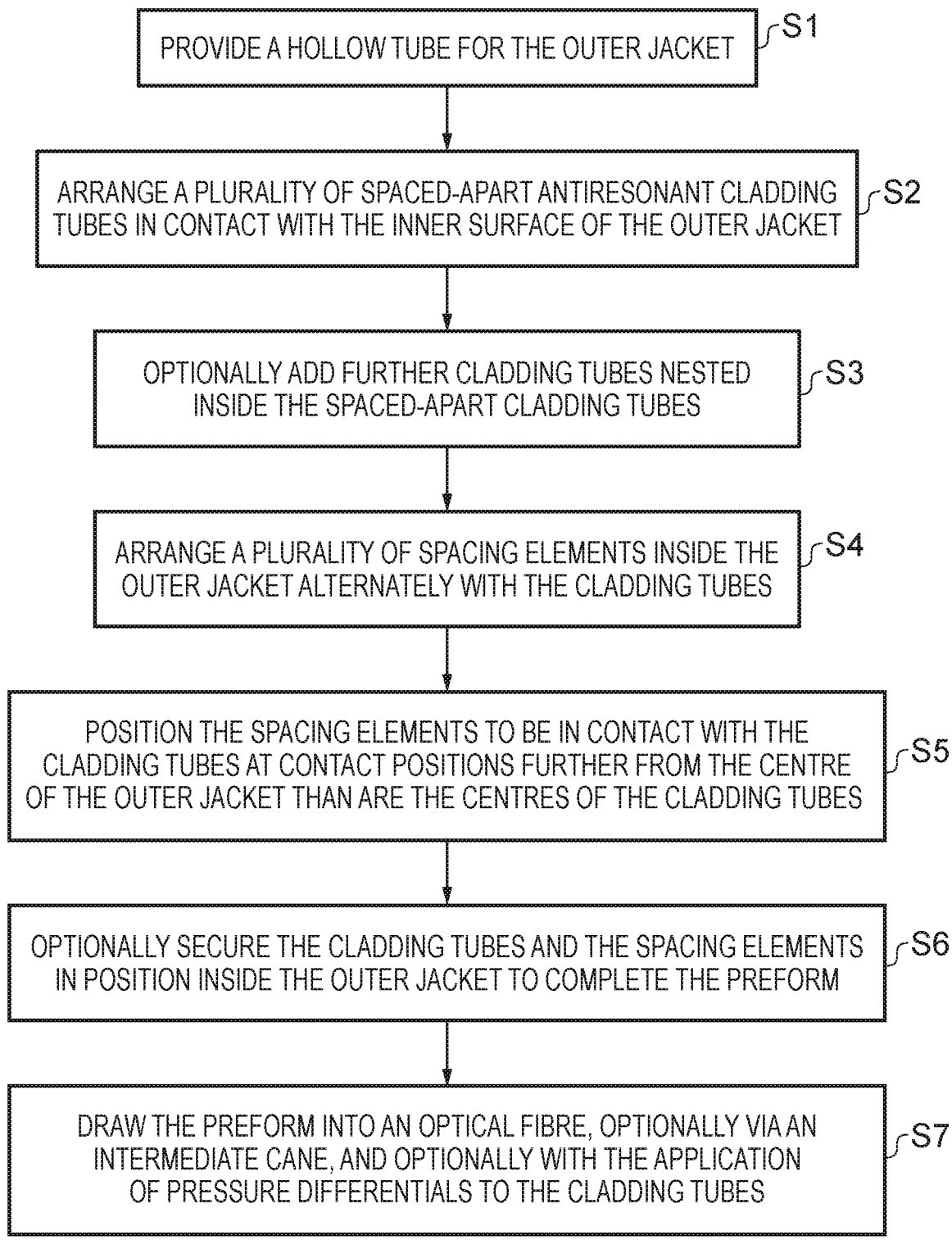
FIG. 15 shows a flow chart of an example method for preform and optical fibre fabrication according to aspects of the disclosure.

FIG. 15 shows a flow chart of steps in an example method of preform and fibre fabrication. As a first step S1, a hollow tube suitable for use as an outer cladding jacket is provided. In step S2, the required number of hollow antiresonant cladding tubes are arranged spaced apart at required azimuthal positions around the inside of the outer jacket and in contact with the inner surface thereof. In an optional step S3, further hollow cladding tubes are inserted into the existing cladding tubes if the preform is for fabricating a nested antiresonant nodeless fibre such as the FIG. 11 examples. Moving to step S4, a plurality of spacing elements are added inside the outer jacket, placed alternately with the cladding tubes. In a next step, S5, the spacing elements are positioned so as to be in contact with the outer surface of their adjacent cladding tubes at contact points which are radially further away from the central longitudinal axis (centres) of the outer jacket than the centres of the cladding tubes are from the centre of the outer jacket. Spacing elements can be included to secure any further hollow cladding tubes that have been optionally added in step S3, in addition to securing the main cladding tubes from step S2. Depending on the tightness of packing of the resulting structure, an optional step S6 may be included in which the cladding tubes and the spacing elements are secured into their positions within the outer jacket. This completes the preform.

A preform fabrication method such as this example in which the various tubes and elements are provided as separate components and the steps of arranging the cladding tubes and the spacing elements inside the outer jacket tube comprise inserting them into the outer jacket tube (either individually or in groups) can be referred to as stacking. However, other options for preform fabrication can be used. For example, some or all of the tubes and elements can be provided by being extruded into the required positions and configurations, or by three-dimensional printing. Using these processes can enable the whole preform to be fabricated in a single stage (so that stages S2 to S5 or S6 in the FIG. 15 example are carried out simultaneously). Alternatively, extrusion or printing might be performed in stages, to build up the whole preform or to create only parts thereof, with other processes such as stacking being used make other parts.

At some subsequent time, and possibly at a different location by a different party, the fabrication of an optical fibre is completed by implementing step S7, in which the fibre is drawn from the preform. Optionally, this may be via an intermediate stage in which a cane is pulled from the preform, the cane then being drawn into the fibre. Also optionally, differential pressures may be applied to the various hollow parts of the preform or cane, particularly the cladding tubes, during the draw in order to control the size and shape of these parts in the finished fibre.

As discussed above, the spacing elements are sized and positioned inside the preform such that the second radial distance r2 (distance to the contact points) is greater than the first radial distance r1 (distance to the centre of the cladding tubes), so r2>r1 or conversely r1<r2. The ratio of r2 to r1 is therefore greater than 1. The geometry of an antiresonant hollow core fibre means that in most common configurations, such as those based on a circular or near circular fibre cross-section, the ratio of r2 to r1 is likely not to exceed two. In other words, the second radial distance will be less than twice the first radial distance. Therefore, a useful range is $1<r2/r2<2$. More typically, $1<r2/r1<1.5$, or $1<r2/r2<1.4$ or $1<r2/r2<1.3$. In many cases, a larger r2 value (the contact points are pushed away from the core and closer to the jacket) will give reduced loss, so other ranges of interest include $1.1<r2/r1<1.5$, $1.1<r2/r1<1.4$, $1.1<r2/r1<1.3$ and $1.1<r2/r1<1.2$; and further, $1.2<r2/r1<1.5$, $1.2<r2/r1<1.4$ and $1.2<r2/r1<1.3$.

As noted above, the spacing elements can have a range of shapes and sizes. Regardless of shape, the spacing element size compared to that of the cladding tubes is of interest. We can define a spacing element to have a cross-sectional area Asp, which may be the cross-sectional area of a single spacing element, or the combined cross-sectional areas of two or more spacing sub-elements that make up a single spacing element. Also, we define the cross-sectional area At of a cladding tube adjacent to the spacing element. In a nested configuration, At is the area of the largest tube in the nest in which the spacing element is in contact. These areas have a ratio Asp/At, which can usefully be chosen to be in the range $0.1<Asp/At<1$, since typically the spacing element will not be larger than the cladding tube (for reasons of space and to maintain r2>r1) and conversely the spacing element provides better anchoring of the cladding tube if it is not too small. Other ranges of interest include $0.15<Asp/At<1$, $0.15<Asp/At<0.75$, $0.15<Asp/At<0.5$ and $0.15<Asp/At<0.4$, or $0.2<Asp/At<1$, $0.2<Asp/At<0.75$, $0.2<Asp/At<0.5$ and $0.2<Asp/At<0.4$, or further, $0.25<Asp/At<1$, $0.25<Asp/At<0.75$, $0.25<Asp/At<0.5$ and $0.25<Asp/At<0.4$, although other values are not excluded.

Regarding the completed fibre drawn from a preform as disclosed herein, the characteristic of r2>r1 may be carried across from the preform to the fibre. However, changes to the relative shapes and sizes of the antiresonant cladding tubes induced by the drawing process may result in the fibre having a different value of r2/r1 than the value for the original preform. In some cases, the resulting fibre may have a value of r2 that approaches or even becomes lower than the r1 value so that r2 r1. Maintaining r2>r1 in the final fibre will likely give better loss characteristics, however.

In the present disclosure the terms "tube" and "capillary" are both used, and should be understood as being generally interchangeable as designations for a hollow elongate element of unspecified cross-sectional shape (so, a tube or capillary may or may not be circular in cross-section). Given the difference in cross-sectional dimensions between a preform and a fibre, however, the term "tube" may be preferred for a preform while "capillary" is preferred for a fibre since it may be considered to suggest a narrower interstitial opening. Unless otherwise specified herein, both terms are used to apply to any and all of a preform, a cane and a fibre, and no limitation is implied by the employment of either term.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] Chengli Wei, R. Joseph Weiblen, Curtis R. Menyuk, and Jonathan Hu, "Negative curvature fibers," Adv. Opt. Photon. 9, 504-561 (2017)
[2] A. D. Pryamikov, A. S. Biriukov, A. F. Kosolapov, V. G. Plotnichenko, S. L. Semjonov, and E. M. Dianov, "Demonstration of a waveguide regime for a silica hollow-core microstructured optical fiber with a negative curvature of the core boundary in the spectral region >3.5 µm," Opt. Express 19, 1441-1448 (2011)
[3] A. N. Kolyadin, A. F. Kosolapov, A. D. Pryamikov, A. S. Biriukov, V. G. Plotnichenko, and E. M. Dianov, "Light transmission in negative curvature hollow core fiber in extremely high material loss region," Opt. Express 21, 9514-9519 (2013)
[4] F. Poletti, "Nested antiresonant nodeless hollow core fiber," Opt. Express 22, 23807-23828 (2014)
[5] WO 2015/185761
[6] Seyedmohammad Abokhamis Mousavi, Seyed Reza Sandoghchi, David J. Richardson, and Francesco Poletti, "Broadband high birefringence and polarizing hollow core antiresonant fibers," Opt. Express 24, 22943-22958 (2016)

The invention claimed is:

1. A preform for an antiresonant hollow core optical fibre comprising:
   an outer jacket tube having an inner surface and a central longitudinal axis;
   a plurality of antiresonant cladding tubes spaced apart at predefined peripheral locations around the inner surface of the outer jacket tube, each antiresonant cladding tube in contact with the inner surface such that a central longitudinal axis of each antiresonant cladding tube is at a first radial distance from the central longitudinal axis of the outer jacket tube;
   a plurality of spacing elements disposed alternately with the antiresonant cladding tubes and each in contact with an outer surface of each of two adjacent antiresonant cladding tubes at one or more contact points, the contact points at a second radial distance from the central longitudinal axis of the outer jacket tube, the second radial distance being greater than the first radial distance; and
   wherein there is not more than one layer of the antiresonant cladding tubes.

2. The preform according to claim 1, in which a ratio of the second radial distance r2 to the first radial distance r1 is in the range of 1<r2/r1<2, or the range of 1<r2/r1<1.5, or the range of 1<r2/r1<1.4, or the range of 1<r2/r1<1.3; or the range of 1<r2/r1<1.2 or the range of 1<r2/r1<1.1.

3. The preform according to claim 1, in which a ratio of the second radial distance r2 to the first radial distance r1 is in the range of 1.1<r2/r1<1.5, or the range of 1.1<r2/r1<1.4, or the range of 1.1<r2/r1<1.3; or the range of 1.1<r2/r1<1.2 or the range of 1.2<r2/r1<1.5 or the range of 1.2<r2/r1<1.4 or the range of 1.2<r2/r1<1.3.

4. The preform according to claim 1, in which at least one spacing element is in contact with the inner surface of the outer jacket tube.

5. The preform according to claim 1, in which at least one spacing elements has a cross-sectional area Asp smaller than a cross-sectional area At of the adjacent antiresonant cladding tube such that 0.1<Asp/At<1.

6. The preform according to claim 1, in which the spacing elements are hollow.

7. The preform according to claim 1, in which the spacing elements are solid.

8. The preform according to claim 1, in which at least one spacing element comprises a group of spacing sub-elements.

9. The preform according to claim 8, in which the spacing sub-elements comprising a spacing element are in contact with each other.

10. The preform according to claim 8, in which the spacing sub-elements comprising a spacing element are spaced apart from each other.

11. The preform according to claim 1, in which the spacing elements are integrally formed with the outer jacket as protrusions extending inwardly from the inner surface.

12. The preform according to claim 1, in which the plurality of spacing elements each have the same cross-sectional size and structure.

13. The preform according to claim 1, in which the plurality of antiresonant cladding tubes are evenly spaced apart with a constant separation between their outer surfaces.

14. The preform according to claim 1, in which the plurality of antiresonant cladding tubes each have the same cross-sectional size, cross-sectional shape and/or wall thickness.

15. The preform according to claim 1, in which the plurality of antiresonant cladding tubes comprise two or more groups of antiresonant cladding tubes, each group having a cross-sectional size, cross-sectional shape and/or wall thickness different from another group, and the antiresonant cladding tubes within a group located diametrically opposite to one another.

16. The preform according to claim 1, further comprising a further plurality of antiresonant cladding tubes arranged such that one or more further antiresonant cladding tubes are nested inside a said antiresonant cladding tube in contact with an inner surface thereof.

17. The preform according to claim 16, further comprising spacing elements disposed within the said antiresonant cladding tubes and each in contact with an inner surface of the said antiresonant cladding tubes, and in contact with an outer surface of a further antiresonant cladding tube at one or more contact points at a radial distance from the central longitudinal axis of the outer jacket tube which is greater than the first radial distance.

18. An intermediate cane for an antiresonant hollow core optical fibre drawn from the preform according to claim 1.

19. An antiresonant hollow core optical fibre drawn from the preform according to claim 1.

20. An antiresonant hollow core optical fibre comprising:
a cladding comprising:
- a tubular outer jacket having an inner surface and a central longitudinal axis;
- a plurality of antiresonant cladding capillaries spaced apart around the inner surface of the outer jacket tube, each antiresonant cladding capillary bonded to the inner surface at a predefined peripheral location such that a central longitudinal axis of each cladding tube is at a first radial distance from the central longitudinal axis of the tubular outer jacket; and
- a plurality of spacing elements disposed alternately with the antiresonant cladding capillaries and each bonded to an outer surface of each of two adjacent antiresonant cladding capillaries at one or more contact points, the contact points at a second radial distance from the central longitudinal axis of the tubular outer jacket; and a core comprising a central void bounded by inwardly-facing portions of the outer surfaces of the antiresonant cladding capillaries;

wherein there is not more than one layer of the antiresonant cladding tubes.

21. The optical fibre according to claim 20, in which the second radial distance is greater than the first radial distance.

22. A method of making a preform for an antiresonant hollow core optical fibre comprising:
providing a plurality of antiresonant cladding tubes at predefined peripheral locations inside an outer jacket tube having an inner surface and a central longitudinal axis such that the antiresonant cladding tubes are spaced apart around the inner surface and each antiresonant cladding tube is in contact with the inner surface such that a central longitudinal axis of each antiresonant cladding tube is at a first radial distance from the central longitudinal axis of the outer jacket tube, wherein there is not more than one layer of the antiresonant cladding tubes;

providing a plurality of spacing elements alternately with the antiresonant cladding tubes and each in contact with an outer surface of each of two adjacent antiresonant cladding tubes at one or more contact points, the contact points at a second radial distance from the central longitudinal axis of the outer jacket tube, the second radial distance being greater than the first radial distance; and optionally securing the antiresonant cladding tubes and the spacing elements into their positions within the outer jacket tube.

23. The method according to claim 22, in which providing the antiresonant cladding tubes comprises inserting the antiresonant cladding tubes into the outer jacket tube.

24. The method according to claim 23, in which providing the plurality of spacing elements comprises inserting the spacing elements into the outer jacket tube.

25. The method according to claim 23, in which providing the plurality of spacing elements comprises providing the outer jacket tube as an outer jacket tube in which the spacing elements comprise protrusions extending inwardly from the inner surface of the outer jacket tube.

26. The method according to claim 22, in which the antiresonant cladding tubes and/or the spacing elements are provided inside the outer jacket tube by extrusion or three-dimensional printing of the antiresonant cladding tubes and/or the spacing elements and/or the outer jacket tube.

27. The method according to claim 22, further comprising providing one or more further antiresonant cladding tubes nested inside at least one of the said antiresonant cladding tubes, at least one of the further antiresonant cladding tubes in contact with an inner surface of the said antiresonant cladding tube, and the nesting including one or more further antiresonant cladding tubes inside the at least one further antiresonant cladding tube and/or two or more adjacent further antiresonant cladding tubes inside the said antiresonant cladding tube.

28. A method of making an antiresonant hollow core optical fibre comprising:
making a preform according to the method of claim 22; and
drawing the preform into an optical fibre.

29. A method of making an intermediate cane for an antiresonant hollow core optical fibre comprising:
making a preform according to the method of claim 22; and
drawing the preform into an intermediate cane.

30. The method according to claim 28, further comprising applying at least one pressure differential between interiors of the antiresonant cladding tubes and the spacing elements, between the antiresonant cladding tubes and a central void bounded by the antiresonant cladding tubes, and/or between the spacing elements and the central void during the drawing.

* * * * *